3,598,822
3-SUBSTITUTED AMINO-6-HYDRAZINO PYRIDAZINES

Paul L. Anderson, Denville, and William J. Houlihan and Robert E. Manning, Mountain Lakes, N.J., assignors to Sandoz-Wander, Inc., Hanover, N.J.
No Drawing. Filed Jan. 21, 1969, Ser. No. 792,764
Int. Cl. C07d 51/04
U.S. Cl. 260—250                                           5 Claims

ABSTRACT OF THE DISCLOSURE

Amino pyridazines substituted with a 6-hydrazino group, e.g., 3-diallylamino-6-hydrazino pyridazine, are active as hypotensives and anorexics.

---

This invention pertains to novel heterocyclic compounds, more particularly, to substituted 6-hydrazino pyridazines. Still more particularly, this invention concerns 3-substituted amino-6-hydrazino pyridazines, intermediates and processes therefor, and acid addition salts thereof.

All the compounds of this invention may be generally represented by the formula

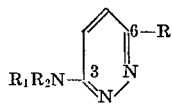

where $R_1$ and $R_2$ each represent hydrogen, or alkenyl having 3-5 carbon atoms, such as allyl, 1-butenyl, or the like, provided at least one of $R_1$ and $R_2$ represents said alkenyl, and
R represents Cl or hydrazine.

One aspect of this invention concerns the following compounds:

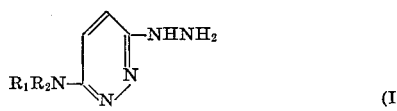

where $R_1$ and $R_2$ are as identified above.

The compounds of Formula I may be prepared according to the following reaction scheme:

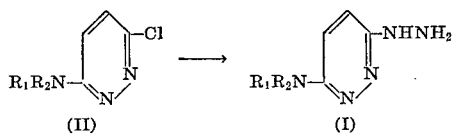

where $R_1$ and $R_2$ are as defined above.

The pyridazines (I) are prepared by treating the corresponding 6-chloro pyridazines (II) with hydrazine at a temperature of about 20 to 115° C., preferably 80 to 115° C. for about 1 to 4 hours. Use of solvent is not necessary, although excess hydrazine or solvents such as methanol or ethanol may be used if desired. The temperature of reaction is not critical. The product (I) is recovered using conventional techniques.

When the compounds (I) are obtained as an acid addition salt and it is desired to convert the salt to the free base, this may be accomplished using conventional methods, e.g., by dissolving the salt in water and adding sodium carbonate.

All of the compounds of Formula II may be prepared according to the following scheme

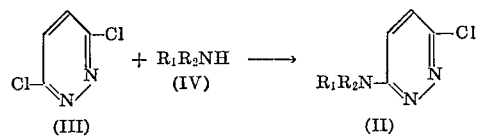

wherein $R_1$ and $R_2$ are as defined above.

The pyridazines (II) are prepared by treating 3,6-dichloropyridazine (III) (a known compound) with an appropriate amine (IV) in inert solvent at a temperature of about 0 to 50° C., preferably 20 to 30° C. for about 1 to 24 hours. Solvents which may be used include lower alkanols, such as methanol, ethanol or isopropanol. When feasible, excess reactant (IV) may also be used as solvent. Neither the solvent nor the reaction temperature is critical. The compounds (II) are recovered using conventional techniques.

The amines of Formula IV are known and are prepared according to methods disclosed in the literature.

The pyridazines represented by Formula I are useful because they possess pharmacological activity in animals. In particular, these compounds are useful as hypotensives, as indicated by their activity in renal hypertensive rat given 30 mg./kg. of active compound using the technique of A. Grollman (Proc. Soc. Exptl. Biol. and Med. 57: 102, 1944) and indirectly measuring the blood pressure from the caudal artery in the tail using a pneumatic pulse transducer.

These compounds are also useful as anorexics as indicated by their activity in rat given 12.5–25 mg./kg. orally of active agent and tested by use of the free feeding method described by Randall et al. (J.P.E.T., 129, 163, 1960) whereby 16 groups of 6 male Wistar rats are deprived of food for 18 hours but receive water ad libitum. Consumption of ground food is then measured over a 4 hour period following oral administration of the agent tested.

When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the compounds (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate, and the like.

In general, satisfactory results are obtained when these compounds are administered for the hypotensive use at a daily dosage of about 1–100 mg./kg. of animal body weight and as an anorexigenic at a daily dosage of about 1–25 mg./kg. of animal body weight. This daily dosage is preferably administered 2 to 4 times a day, or in sustained release form. For most large mammals such as primates, the total daily dosage for hypotensive use is about 50–400 milligrams whereas for the anorexic use it is about 50–250 milligrams. Dosage forms suitable for internal use comprise from about 12.5 mg. to 200 mg. and 12.5 mg. to 125 mg., respectively, of the active compound in intimate admixture with a solid or liquid pharmaceutically acceptable carrier or diluent.

A representative formulation suitable for oral administration is a tablet prepared by standard tabletting techniques which contains the following:

| Ingredients: | Parts by weight |
|---|---|
| 3-diallylamino-6-hydrozino-pyridazine dihydrochloride | 10 |
| Tragacanth | 2 |
| Lactose | 79.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

6-chloro-3-diallylamino-pyridazine

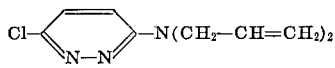

To an ice bath cooled solution of 29.7 g. of 3,6-dichloropyridazine in 250 ml. of ethanol is added slowly with stirring 38.8 g. of diallylamine. The reaction mixture is refluxed 118 hours and the solvent removed at reduced pressure. To the residue is added 300 ml. of water and 35 ml. of a 50% aqueous sodium hydroxide solution. The mixture is extracted with ether, the ether extracts are dried and the solvent is removed. Crystallization from ether-pentane (1:1) provides 6-chloro-3-diallylamino-pyridazine, M.P. 43°–46° C.

EXAMPLE 2

3-diallylamino-6-hydrazino-pyridazine dihydrochloride

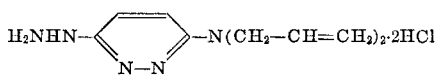

To 20.0 g. of 6-chloro-3-diallylamino-pyridazine is added slowly with stirring 214 ml. of a 97% hydrazine solution. After the pyridazine derivative dissolves, the mixture is refluxed for 16 hours, cooled, and 250 ml. of water is added. The mixture is extracted with chloroform and the chloroform extracts are then dried and the solvent evaporated. The resultant oil is dissolved in methanol (200 ml.), and hydrogen chloride gas is bubbled through. The oil is then decolorized with carbon and the solvent is removed at reduced pressure. The product salt is crystallized from methanol-ether (1:1), filtered and recrystallized from methanol-ether (1:1) to give 3-diallylamino - 6 - hydrazino - pyridazine dihydrochloride, M.P. 211°–214° C.

What is claimed is:

1. A compound of the formula

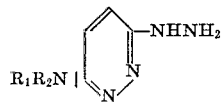

where each $R_1$ and $R_2$ represent hydrogen or alkenyl having 3–5 carbon atoms, provided at least one of $R_1$ and $R_2$ represents said alkenyl, or a pharmaceutically acceptable acid addition salt thereof.

2. The compound of claim 1 which is 3-diallylamino-6-hydrozino-pyridazine.

3. A process for preparing a compound of claim 1 in free base form which comprises treating in solvent a compound of the formula

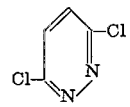

with a compound of the formula $$R_1R_2NH$$

to obtain an intermediate of the formula

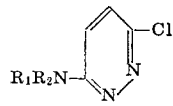

and treating said intermediate with hydrazine, where each $R_1$ and $R_2$ represent hydrogen or alkenyl having 3–5 carbon atoms, provided at least one of $R_1$ and $R_2$ represents said alkenyl.

4. A compound of the formula

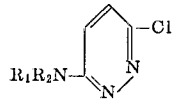

where each $R_1$ and $R_2$ represent hydrogen or alkenyl having 3–5 carbon atoms, provided at least one of $R_1$ and $R_2$ represents said alkenyl.

5. The compound of claim 5 which is 6-chloro-3-diallylamino-pyridazine.

References Cited

Chemical Abstracts, vol. 60, 15871–15872 (1964).

NICHOLAS S. RIZZO, Primary Examiner

U.S. Cl. X.R.

424—250